(12) United States Patent
Kessler

(10) Patent No.: US 7,529,700 B1
(45) Date of Patent: May 5, 2009

(54) SINGLE-SOURCE MULTI-CONDUIT APPARATUSES AND METHODS FOR ADJUDICATING PRETAX EXPENSES

(75) Inventor: Jon Kessler, San Carlos, CA (US)

(73) Assignee: Wageworks, Inc., San Mateo, CA (US)

( * ) Notice: Subject to any disclaimer, the term of this patent is extended or adjusted under 35 U.S.C. 154(b) by 663 days.

(21) Appl. No.: 10/193,403

(22) Filed: Jul. 10, 2002

Related U.S. Application Data

(60) Provisional application No. 60/304,606, filed on Jul. 10, 2001, provisional application No. 60/307,077, filed on Jul. 21, 2001.

(51) Int. Cl.
   *G06F 17/22* (2006.01)
(52) U.S. Cl. .................. 705/31; 705/36; 705/2
(58) Field of Classification Search ............ 705/30, 705/31, 35, 39, 40, 2, 36
   See application file for complete search history.

(56) References Cited

U.S. PATENT DOCUMENTS

| | | | |
|---|---|---|---|
| 6,012,035 A * | 1/2000 | Freeman et al. ............ 705/2 |
| 6,067,522 A * | 5/2000 | Warady et al. ............ 705/2 |
| 2002/0147678 A1 * | 10/2002 | Drunsic ............ 705/39 |
| 2003/0026404 A1 * | 2/2003 | Joyce et al. ............ 379/144.01 |
| 2003/0061153 A1 * | 3/2003 | Birdsong et al. ............ 705/39 |
| 2004/0249745 A1 * | 12/2004 | Baaren ............ 705/39 |
| 2005/0033677 A1 * | 2/2005 | Birdsong et al. ............ 705/35 |
| 2005/0080692 A1 * | 4/2005 | Padam et al. ............ 705/30 |

* cited by examiner

*Primary Examiner*—Vanel Frenel
(74) *Attorney, Agent, or Firm*—Blakely, Sokoloff, Taylor & Zafman LLP

(57) ABSTRACT

Methods and apparatuses for adjudicating expenses are described herein. In one aspect of the invention, an exemplary method includes determining whether the adjudicated expenses of a transaction are qualified for pretax spending, including submitting the adjudicated expenses through at least two adjudicating conduits, and processing the transaction based on the determination and based on which adjudicating conduit the adjudicated expenses are received. Other methods and systems are also described.

63 Claims, 10 Drawing Sheets

FIG. 4

| /401 | /402 | /403 | /404 | /405 | /406 | /407 | /408 |
|---|---|---|---|---|---|---|---|
| User ID | Device Holder Name | Maximum Benefit | Type of Benefit | Maximum Benefit Period | Date of Transaction | Amount of Transaction Requested | Merchant Code |
| 541039233 | David Smith | $1,000 | Health Care | January 1, 2002- December 31, 2002 | February 1, 2002 | $15 | 3495 |
| 576983256 | Jane Briggs | $100 | Transit | March 1, 2002 – March 31, 2002 | February 10, 2002 | $65 | 5389 |

| /409 | /410 | /411 | /412 | /413 | /414 | /415 | /416 |
|---|---|---|---|---|---|---|---|
| Merchant Name | Name of Person Receiving Benefits | Service Type Code | System Approval Code | Amount of Transaction Approved | Date and Time of Approval | Type of Transaction | Additional Transactional Information |
| Dr. Zhivago | David Smith | Co payment | MCD3234 | $15 | February 1, 2002 1300H PST | Card ID# xxxxxxx | |
| DC Metro | Jane Briggs | Transit Pass | TPD8443 | $65 | February 10, 2002 | Catalog purchase | |

/400

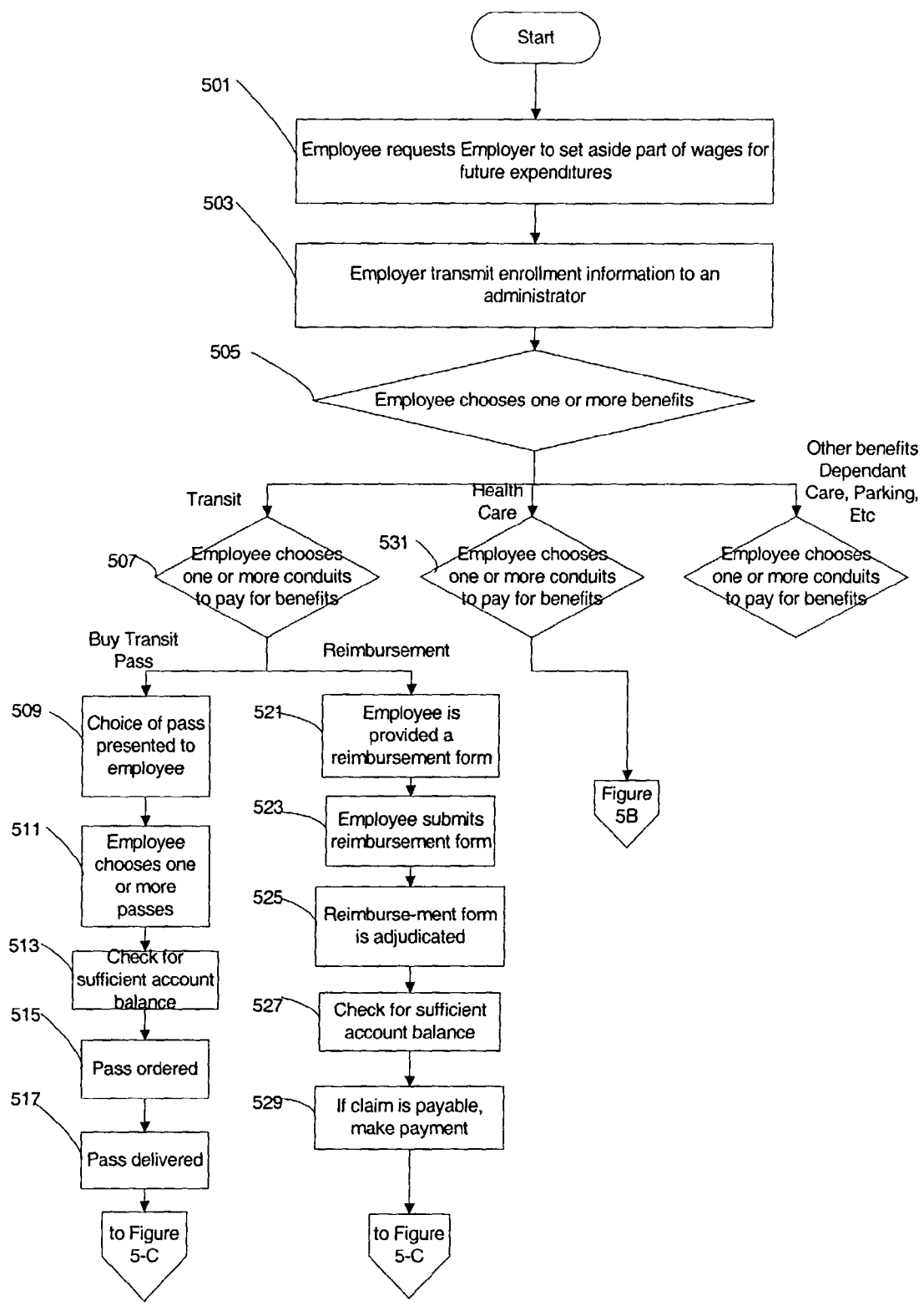

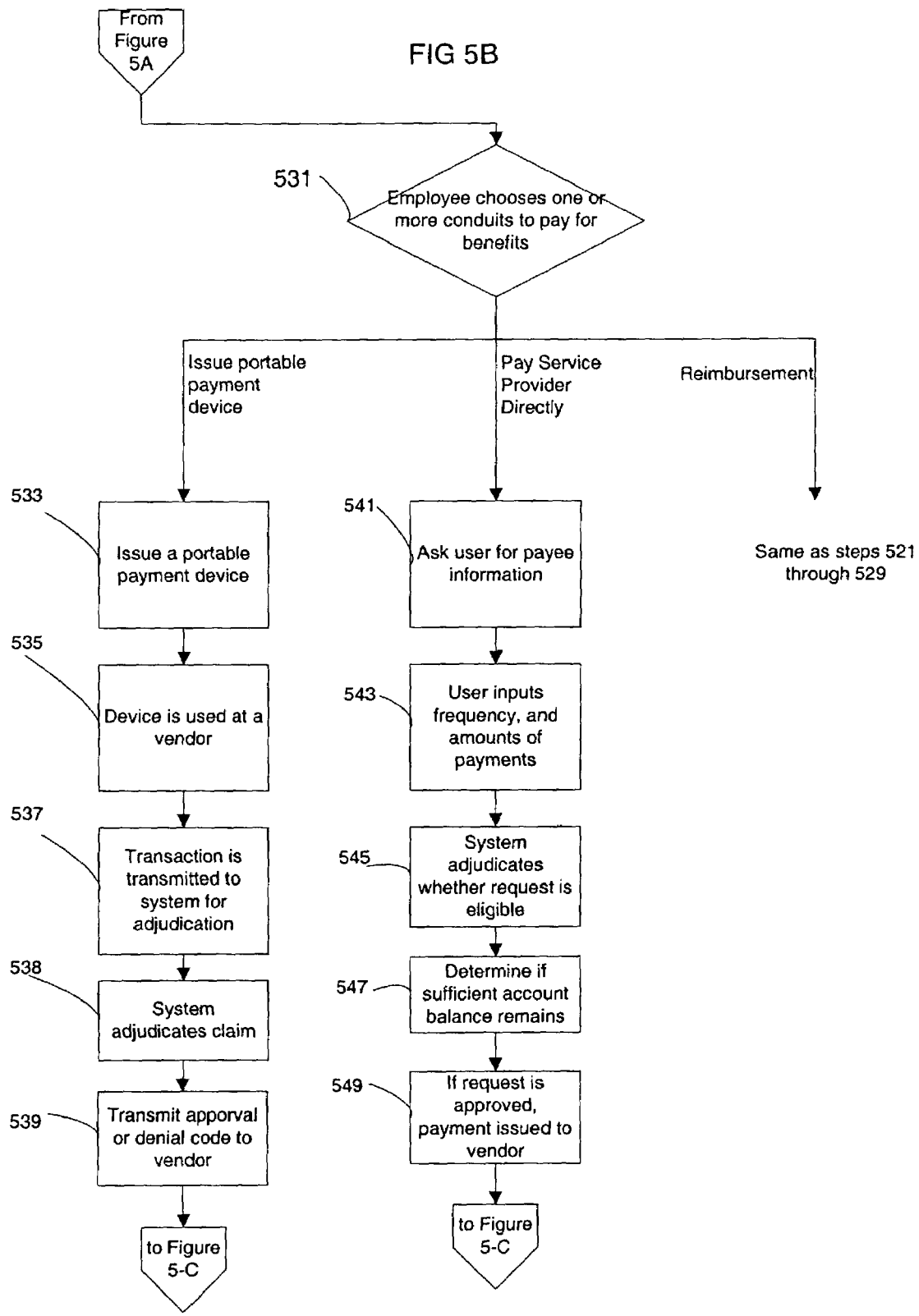

SINGLE-SOURCE MULTI-CONDUIT APPARATUSES AND METHODS FOR ADJUDICATING PRETAX EXPENSES

RELATED APPLICATIONS

This application claims the benefit of U.S. Provisional Application No. 60/304,606, entitled "Single-sourced Multi-conduit Employee Benefits Purchasing System and Method Therefor", filed Jul. 10, 2001 and U.S. Provisional Application No. 60/307,077, entitled "System and Method for Employee Benefits Purchase Using Portable Devices", filed Jul. 21, 2001, which are hereby incorporated by reference.

FIELD OF THE INVENTION

This invention relates generally to adjudicating expenses, and in particular to electronically adjudicating pretax expenses of an employee through a single-source multi-conduit mechanism.

BACKGROUND OF THE INVENTION

Sections 125 and 132(f) of the Internal Revenue Code of 1986 (26 USC §§ 125, 132(f), hereinafter IRC) provides that employees may purchase certain employee benefits using pre-tax dollars. Under an individual salary reduction arrangement with the employer, an employee may request the employer to set aside a part of his ordinarily taxable wages for purchasing benefits, without having such amounts being taxed for income and employment tax purposes. Among others, the benefits may include health care benefits and dependent care benefits, as well as expenditures related to commuting to work, such as fare media for public transit and qualified parking or van pool fares (e.g., hereafter collectively Commuter Benefits). Business expenses subject to similar substantiation and adjudication rules are governed by IRC Sections 61, 162, and 274.

Typically bookkeeping accounts (called Flexible Spending Accounts, hereafter "FSA"), are established between the employer and the employee to account for the employee's salary reduction and the payments for health care and dependent care. Generally, under such an arrangement, an employee requests the employer to set aside certain amounts of his wages for a plan year to pay for qualified health or dependent care benefits. The employer then deducts from each paycheck an amount equal to the annual election divided by the number of payroll periods in the plan year. The employee can then request payment for benefits from the flexible spending account (FSA). The payments from these accounts for qualified benefits are not taxable to the employee.

Generally, each type of benefit (e.g., health care and dependent care, etc.) must have its own separate FSA. This is because, among other things, the different way benefits are available from each type of account.

Traditionally, benefits from FSA are paid through a reimbursement process. Under a reimbursement process, an employee submits a claim to a claim administrator for adjudication. The claim administrator can be the employer or a third party administrator (TPA). The regulatory requirement for claim reimbursement is that the employee must submit:

a statement from the provider indicating that medical services or products were sold to the employee (or to his spouse or dependents), and the amount of the expenses, and a statement by the employee that the claim has not been reimbursed and is not reimbursable by other insurance.

A conventional process is illustrated in FIG. 1. In a conventional reimbursement process, the employee directs his employer to set aside part of each paycheck for future benefits at step 101 (that is, the Annual Election). At step 103, the employer establishes an FSA for the employee and credits the account with the amount the employee elected to set aside at step 101. The employee then buys an eligible item, such as prescription drugs, at step 105 using his own money. At step 107, the employee completes and submits a paper claim form accompanied by paper receipts to a claims administrator. The receipt must satisfy the third party statement requirement. That is, it must state that eligible services or products were provided and the amount paid. The claim form may also contain the employee statement that the claim has not been reimbursed or is not reimbursable by other insurance or plans. At step 109, the administrator reviews the documents to determine whether the item is eligible for reimbursement under the law. At step 111, the administrator further reviews whether the amounts were stated on the receipt. At step 113 the administrator further reviews whether the employee's FSA has sufficient balance to pay such expenses. At step 115, if the claim is determined reimbursable under steps 109 through 113, the administrator issues a check for the amount of claim to the employee. At step 117, the administrator debits the employee's FSA for the amount of benefits paid. If the claim failed to satisfy any one of the steps 109, 111 or 113, the claim is denied and the administrator issues a letter of denial to the employee at step 119.

One problem with this arrangement is that the employee must prove that the expenses were legally eligible for reimbursement. It is too complicated for most employees to determine whether an expense is eligible before submission. Employee either fails to submit eligible claims or submits all claims regardless of eligibility. The former results in underutilized benefits, while the latter results in high costs to the employer because it must adjudicate both eligible and ineligible claims.

A second related problem is that the adjudication process is not transparent to the employee. There is no feedback to the employee. For example, the employee is not normally notified that the claim form was received, the claim form was completed properly, or that the claim is being adjudicated. Occasionally, the claim may be rejected with reasons that are not entirely clear to the employee, at which point the employee must initiate a claim review process with the administrator. This results in frustration to the employee and added costs to the employer.

A third problem with the reimbursement arrangement is the cash flow burden on the employee. The employee essentially must pay twice before he can request a reimbursement: the first time by reducing his salary and the second time by paying for the services. Since the typical reimbursement process can take from 30 to 90 days, the cash flow burden is too much for most employees, so they may rather forgo the tax savings by not participating in the plan.

In addition, a conventional method often involves human processes which may lead to undesirable errors. For example, a human may misread or fail to read handwritten notations on a receipt and erroneously deny or approve a claim.

Furthermore, when an employee of a corporation travels during a business related trip, often some but not all expenses are qualified for business expenses. The employee needs to itemize in paper work in order to claim the expenses as business expenses for the tax purposes. Such paper works discussed above pose significant burdens on the business people. Thus, better solutions are desirable.

SUMMARY OF THE INVENTION

Methods and apparatuses for adjudicating expenses are described herein. In one aspect of the invention, an exemplary method includes determining whether the adjudicated expenses of a transaction are qualified for pretax spending, including submitting the adjudicated expenses through at least two adjudicating conduits, and processing the transaction based on the determination and based on which adjudicating conduit the adjudicated expenses are received.

The present invention also includes apparatuses which perform these methods and machine-readable media which, when executed on a data processing system, cause the system to perform these methods. Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

FIG. 4 shows an exemplary record of a transaction.

FIGS. 5A-5B-5C are flow charts illustrating exemplary claim processes.

DETAILED DESCRIPTION

Figure 1:
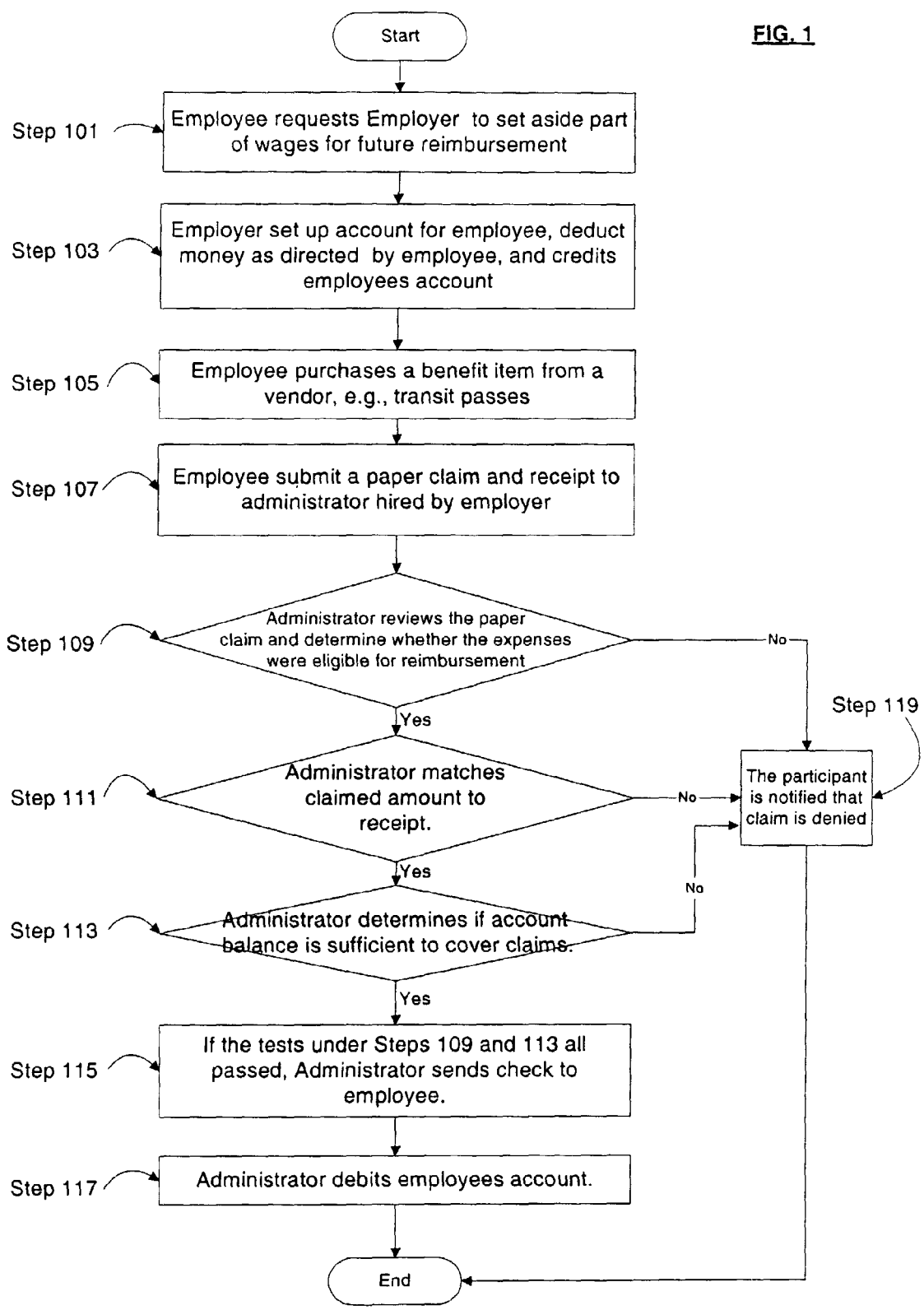
FIG. 1 shows a flow chart illustrating a conventional claim reimbursement process.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Embodiments of the present invention may be embodied as a set of computer programs for presenting to a user one or more choices of logical access methods, hereinafter "conduits," for the purpose of purchasing one or more employee benefits. It would be understood by one of ordinary skill in the art that the invention as described herein could also be embodied in a set of manual processing methodologies not involving computer programs and computers.

Figure 2:
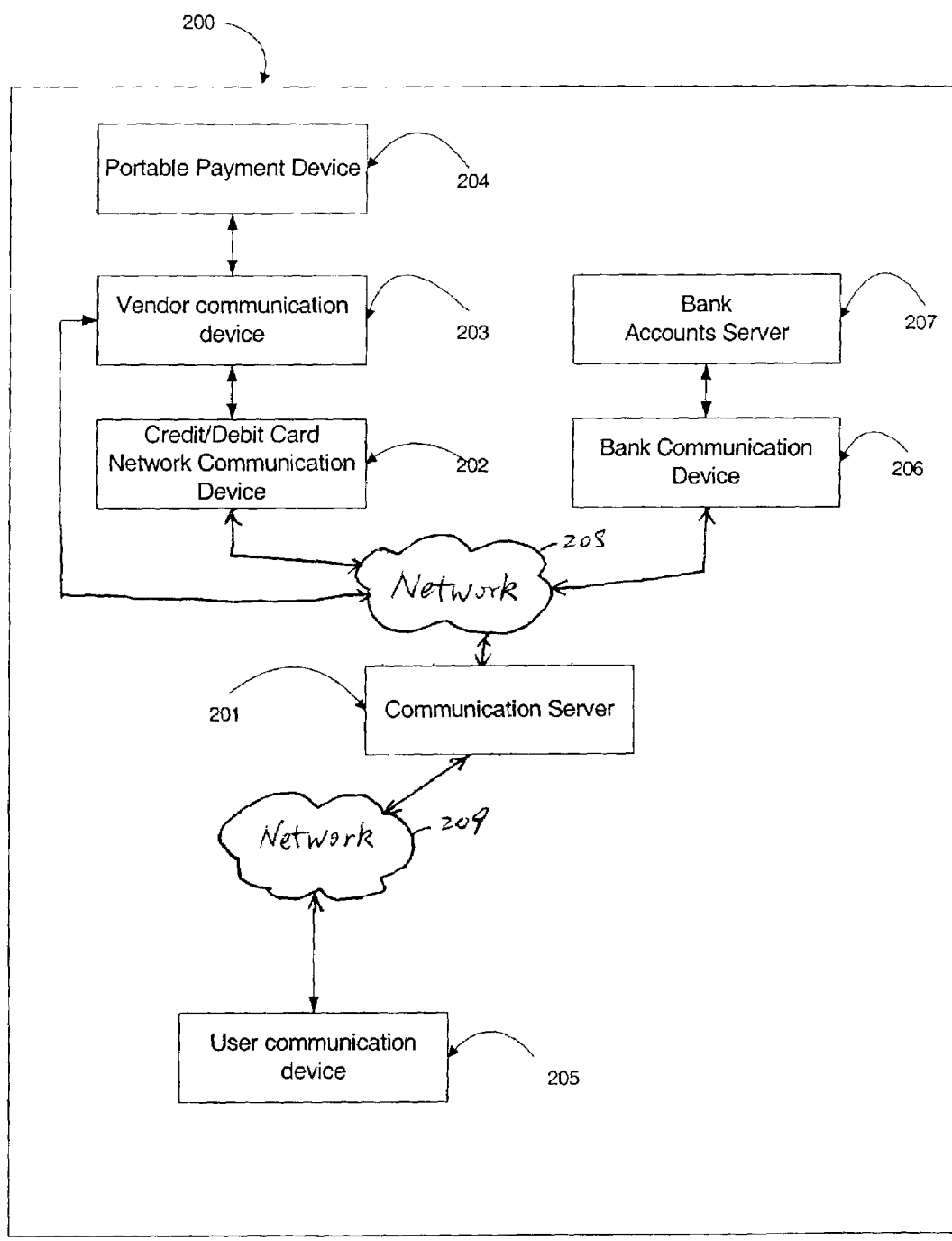
FIG. 2 shows a block diagram of an exemplary data processing system for adjudicating claims.

FIG. 2 shows a block diagram of an exemplary data processing system in accordance with an aspect of the invention. In one embodiment, the exemplary system includes a communication server 201, one or more credit/debit card network communication devices 202, a vendor communication device 203, a portable payment device 204, communication device 202, communication server 201, a user communication device 205, bank communication device 206, and a bank accounts server 207. Other components may be implemented.

The communication server 201 can be embodied as a system controller, a dedicated hardware circuit, a programmed general-purpose computer, or any other functionally equivalent configurable electronic, mechanical, or electromechanical device. Communication server 201 operates as a primary server and is capable of high volume processing, performing a significant number of mathematical calculations in processing communications and database searches. Communication server 201 may be a conventional personal computer or a computer workstation with sufficient memory and processing capability. For example, a Pentium® microprocessor manufactured by Intel, Inc., may be used for central processing unit (CPU) 301. Alternatively equivalent processors include a PowerPC microprocessor, manufactured by Motorola, Inc. or an UltraSPARC microprocessor, manufactured by Sun Microsystems, Inc.

The card network communication device 202 and vendor communication device 203 can likewise be embodied as dedicated hardware circuits, programmed general purpose computers, personal computers, telephones, pagers, palmtop computers, or any other functionally equivalent configurable electronic, mechanical, or electromechanical devices. The devices can be in communication with the communication server 201 via a network 208, such as a Local Area Network (LAN), a Wide Area Network (WAN), a Public Switched Phone Network (PSTN), a cable network, or an Internet Protocol (IP) network, such as an intranet, extranet, or Internet. Communication may also be provided by dedicated data lines, cellular, Personal Communication Systems ("PCS"), microwave or satellite networks. Other communication channels may be utilized.

The communication device 203 can be further configured with electromagnetic input devices (such as a magnetic card reader) or wireless communication device (such as those conforming to the IEEE 802.11a standards) such that it can communicate with portable payment devices 204.

Portable payment device 204 can be embodied in many forms, including magnetically encoded plastic cards, plastic cards with embedded microprocessors and nonvolatile memory (sometimes known as "smartcards"), program codes for wireless communication devices such as microprocessor-enhanced cellular telephone, as well as personal digital assistants (PDAs) such as those manufactured by Palm Corporation and Handspring Inc., and other devices that have electronic communication capabilities.

The user communication device 205 can likewise be embodied as dedicated hardware circuits, programmed general purpose computers, personal computers, telephones, cellular telephones, pagers such as the BlackBerry from Research in Motion Limited, palmtop computers, personal digital assistant (PDA), or any other functionally equivalent configurable electronic, mechanical, or electromechanical devices. The devices can be in communication with the communication server 201 via a network 209, such as a Local Area Network (LAN), a Wide Area Network (WAN), a Public Switched Phone Network (PSTN), a cable network, or an Internet Protocol (IP) network, such as an intranet, extranet, or Internet. Communication may also be provided by dedicated data lines, cellular, Personal Communication Systems ("PCS"), microwave or satellite networks.

The bank communication device 206 can be configured similar to communication server 201. The bank communication device 206 can be in communication with the communication server 201 via the network 208, such as a Local Area Network (LAN), a Wide Area Network (WAN), a Public Switched Phone Network (PSTN), a cable network, or an Internet Protocol (IP) network, such as an intranet, extranet, or Internet. Communication may also be provided by dedicated data lines, cellular, Personal Communication Systems ("PCS"), microwave or satellite networks. The bank communication device 206 is also in connection with bank account server 207 such that transaction request from communication server 201 can be transmitted to bank account server 207 via device 206.

The bank account server can be configured similar to communication server 201. The purpose of bank account server 207 is to hold account information for banking transactions, and may incorporate device 206. Using these components, managing data collection, claims adjudication, products and service purchases, and billing for purchases may be performed. The networks 208 and 209 may be an identical network. Alternatively, networks 208 and 209 may be different networks. Furthermore, devices 202-203 and 205-206 may communicate with communication server 201 through the same network or different networks, with the same or different network protocols. Such networks may be a Local Area Network (LAN), a Wide Area Network (WAN), a Public Switched Phone Network (PSTN), a cable network, or an Internet Protocol (IP) network, such as an intranet, extranet, or Internet. Communication may also be provided by dedicated data lines, cellular, Personal Communication Systems ("PCS"), microwave or satellite networks. Other configuration may be implemented.

Figure 3:
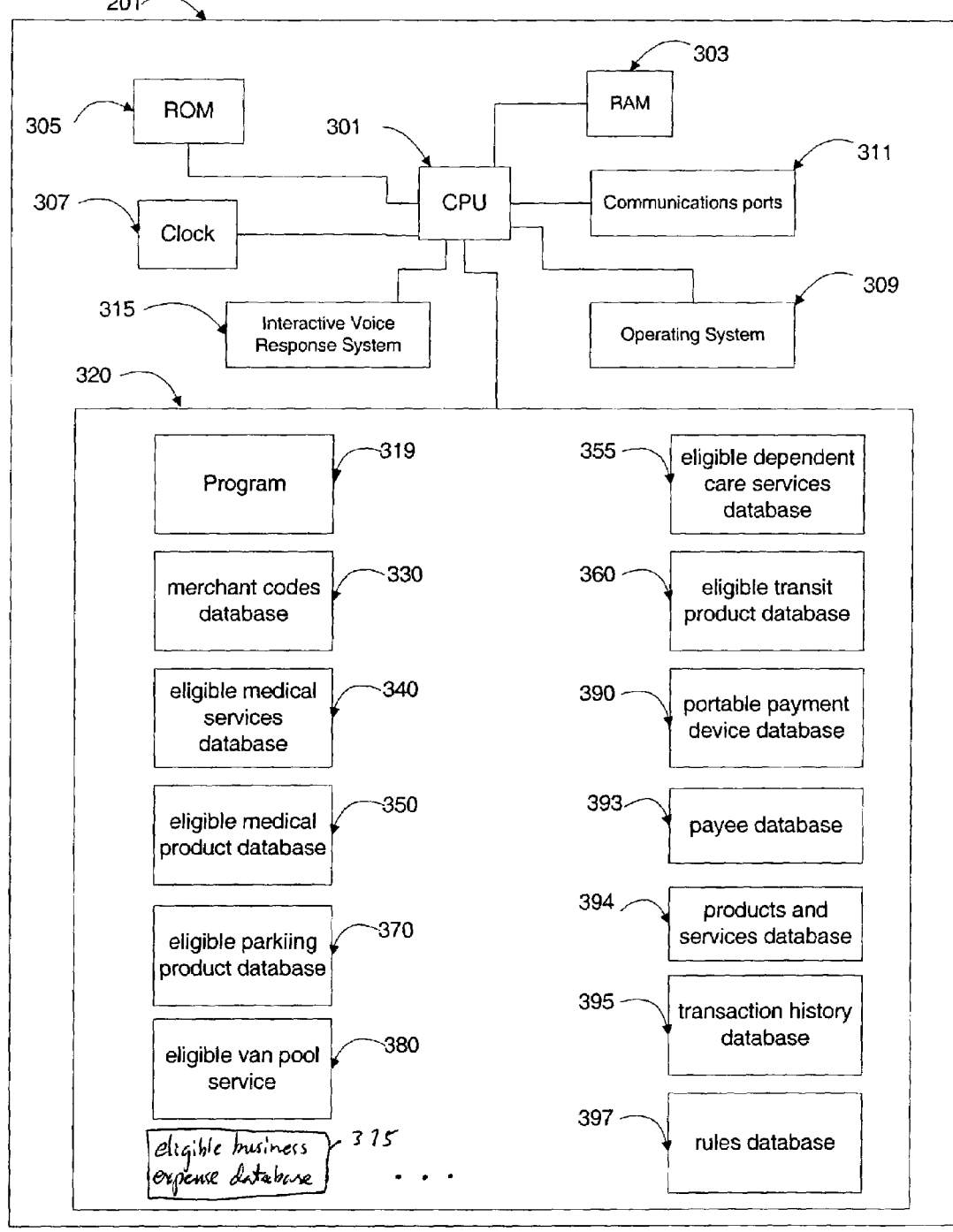
FIG. 3 shows a block diagram of an exemplary controller of the system of FIG. 2.

FIG. 3 shows a block diagram of an exemplary communication server, such as server 201, in accordance with one aspect of the invention. Referring FIG. 3, communication server 201 includes a central controller preferably a central processing unit (CPU) 301, RAM (Random Access Memory) 303, ROM (Read Only Memory) 305, a clock 307, an operating system 309, one or more communications ports 311, and an interactive voice response (IVR) system 315, and a data storage device 320. All of these elements are connected to CPU 301 to facilitate communication between them.

Operating system 309 comprises a conventional operating system such as DOS or Windows operating system software, manufactured by Microsoft Corporation, or UNIX operating system such as Solaris, manufactured by Sun Microsystems, Inc. Alternatively, the operating system 309 may be a Linux operating system, or an embedded real-time operating system. Other operating systems, such as MacOS from Apple Computer, may be utilized.

Data storage device 320 may be implemented using a persistent memory system which may include random access memory (RAM), flash memory, hard disk drives and/or other appropriate combination of mechanical, electronic or optical data recording units, which include CD-RW, DVD-RW drives and micro-disk drives. The processor 301 and the data storage device 320 may each be (i) located entirely within a single computer or other computing device, (ii) connected to each other by a remote communication medium, such as a serial port cable, telephone cable, telephone line or radio frequency, or (iii) a combination thereof. In one embodiment, the communication server 201 may comprise one or more computers that are connected to a remote server computer for maintaining databases. In one embodiment, the storage device 320 may include multiple storage medias through a storage server (not shown). Alternatively, the storage device 320 may be a remote storage device through a network, such as a storage area network (SAN) or a network attached storage (NAS). Other forms of storage may be implemented.

In one embodiment, where the processor 301 is a general-purpose microprocessor, the data storage device 320 stores program 319, which includes instructions for controlling the processor 301. The processor 301 performs instructions of the program 319, and thereby operates in accordance with the methods described in detail herein. The program 319 may be stored in a compressed, uncompiled, and/or encrypted format. The program 319 further includes elements that may be necessary, such as an operating system, a database management system and device drivers for allowing the processor 301 to interface with computer peripheral devices. Appropriate device drivers and other necessary program elements are known to those skilled in the art, and need not be described in detail herein.

In the embodiment of FIG. 3, the program 319 stores data accumulated, or computed by, the processor 301 on the data storage device 320. This stored data is organized and indexed in one or more related databases 330, 340, 350, 355, 360, 370, 380, 390, 393, 394, 395, and 397. It will be appreciated that these databases may be organized as object oriented, relational, hierarchical file systems, database systems, or any suitable data organization scheme. Other databases, such as employer business related expense databases, may be implemented.

In the exemplary embodiment illustrated in FIG. 3, the related databases include a merchant code database 330, eligible medical services database 340, eligible medical products database 350, eligible dependent care services database 355, eligible transit product database 360, eligible parking product database 370, eligible van pool product database 380, a database of portable payment devices that have been issued 390, a payee database 393, database 394 for products and services available for direct purchase, a transaction history database 395, a rules database 397, and an eligible business expenses database 375. In one embodiment, database software such as Oracle 9i, manufactured by Oracle Corporation, creates and manages these databases. Other database software, such as those from IBM or Microsoft Corporation, may be utilized. The databases 330, 340, 350, 355, 360, 370, 380, 390, 393, 394, 395, 397, and 375 are described below. Any schematic illustrations and accompanying descriptions of the databases presented herein are exemplary arrangements for the stored information. As will be understood by those skilled in the art, a number of other arrangements may be employed besides those discussed. One of ordinary skill in the art would recognize that the database fields and records discussed and illustrated in FIG. 4 are for illustrative purposes only, and that the databases 330, 340, 350, 355, 360, 370, 380, 390, 393, 394, 395, 397, and 375 could contain any number of fields and records. These databases may be implemented with relational database technologies. Other database technologies may be utilized.

Merchant code database 330 maintains data about the type of vendor, and in one embodiment, includes numeric data used by the standard credit and debit card networks to identify the type of vendor, such as transit provider, drug store, and medical supplies merchant. This information can be obtained prior to any claim adjudication or dynamically updated with each transaction.

Eligible medical services database 340 maintains a list of services that are eligible for reimbursement as medical expenses under the above-cited Internal Revenue Codes and the Treasury Regulations thereunder.

Eligible medical product database 350 maintains a list of products that are eligible for reimbursement as medical expenses under the above-cited Internal Revenue Codes and the Treasury Regulations thereunder.

Eligible dependent care services database 355 maintains a list of services that are eligible for reimbursement as dependent care expenses under the above-cited Internal Revenue Codes and the Treasury Regulations thereunder.

Eligible transit product database 360 maintains data about products that are considered eligible for transit benefits under the above-cited Internal Revenue Codes and the Treasury Regulations. In one embodiment, database 360 includes information about the type of media (magnetic, paper, or electronic), the vendors who supply such products, and which transit system such products can be used.

Eligible parking product database 370 maintains data related to commute services, such as parking services, that are considered eligible for Commuter Benefits under the above-cited Internal Revenue Codes and the Treasury Regulations thereunder. In one embodiment, database 370 includes the location of the spaces, and the vendors who supply such spaces.

Eligible van pool product database 380 maintains data about van pool services that are considered eligible for Commuter Benefits treatment under the above-cited Internal Revenue Codes and the Treasury Regulations thereunder. In one embodiment, database 380 includes the name of the provider, geographical area for which the services are provided, and the address of vendors who supply such services.

Portable payment device database 390 maintains data all portable payment devices that have been issued. In one embodiment, database 390 includes the individual name to which the device was issued, the device identification number, the date range for which the device is usable for payment, the type of device (e.g., magnetically coded plastic card), the benefits the device can be used to buy, and the active or inactive status of the device.

Payee database 393 maintains data of possible payees. The possible payees may be different from the actual service and product provider. In one embodiment, database 393 includes the individual or legal entity name, the address to which the payee should receive payments, and a tax identification number, with such data being either gathered by the system to a transaction or inputted by a user, and may contain information derived from other databases.

Product and service database 394 maintains data of possible products or services that could be purchased by a user. In one embodiment, database 394 includes the name of the provider of the products or services, the prices for such products or services, the estimated time of delivery of the product or services, the cut-off date and time to make the purchases in order to ensure the deliver of the products and services within the estimated time. It may contain information derived from other databases.

Eligible business expense database 375 maintains data about expenses that are considered eligible for deductions under the above cited RFC and the Treasury Regulations thereunder. In one embodiment, database 375 includes the different rates of deductions for each type of business expenses.

Transaction history database 395 maintains data related to each individual device's transaction history. The transaction history records all the transactions, starting from the maximum available benefits available for a particular benefits, to each approved and unapproved transactions, and the related time and date that such transactions occur. This is explained in more detail with reference to FIG. 4.

An exemplary transaction history record 400 from the transaction history database 395 is shown in FIG. 4. As shown, the transaction history database 395 maintains fields data on the transactions in fields 401-415, such as user identification field 401, user name field 402, maximum benefit field 403, type of benefit field 404, the duration of maximum benefit field 405, and date of transaction field 406, the amount of transaction requested field 407, the merchant code field 408, merchant name field 409, name of service recipient field 410, product or service type code field 411, transaction authorization code field 412, amount of transaction approved field 413, date and time of approval field 414, type of transaction field 415. In one embodiment, additional fields starting at 416 may store additional information provided by vendor when communication server 201 request such information from the vendor as part of a transaction. As will be understood by those skilled in the art, each transaction history record 400 may have more information than described. Furthermore, each payment device may have many transactions, and the transaction history database 395 may have many records similar to record 400. An account balance, or the amount of available benefits, can be computed by subtracting from the maximum benefit field 403 the sum of all the benefits that had been approved and paid (field 413, or its equivalent, for each transaction).

Rules database 397 maintains the decision rules necessary to determine whether the purchases to be made by a user through the various conduits are allowed under the laws and employer imposed limits. In one embodiment, they are stored as "if-then-else" statements that may include questions as to whether the product or services are eligible, the amount the individual may use for one or more of the products and services, questions to posed to a merchant regarding the details of the products and services to be purchased, the date of the transaction.

Figure 5C:
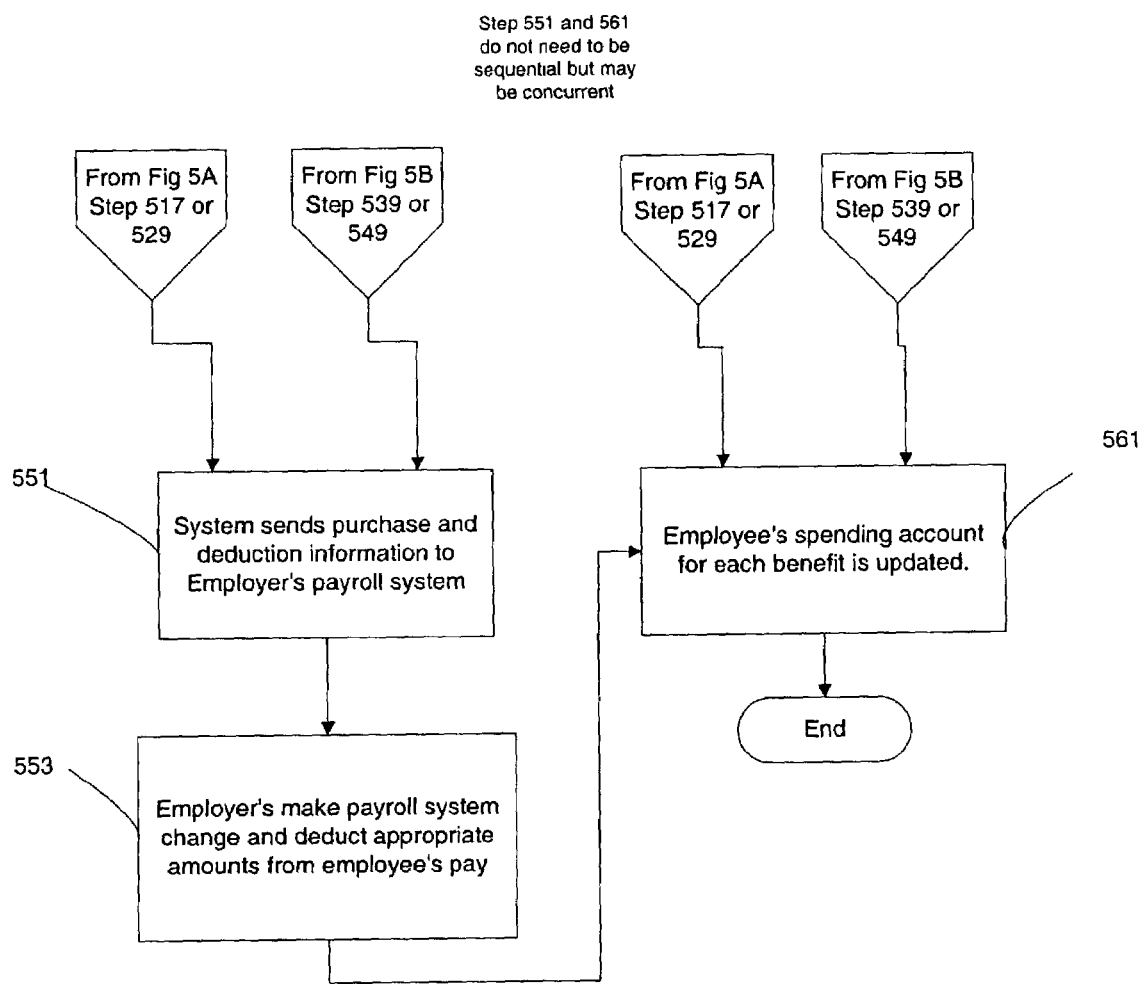

FIGS. 5A-5C illustrate a new design of a process to collect and adjudicate claims using a computerized system. The process begins by the employee enrolling in a benefit at step 501. At this step, the employee may direct his employer to set aside certain amounts for the purchase of benefits, and an account for each benefit may be established. This is similar to step 101 in FIG. 1, and may occur by paper, by telecommunication devices, or other electronic means. At step 503, the employer transmits all enrollment information to the administrator, as well as other information such as the co-payment amount under another health plans. In one embodiment, such information is stored in communication server 201.

At step 505, the employee may choose one or more of the benefits he wishes to purchase by using the communication device 205 to communicate with communication server 201. An example of the benefit may be the purchase of a transit pass. At step 507, the employee is further presented with different conduits for the benefit, and therefore may choose one of the conduits that would be appropriate. In this example, the employee may choose between having the system issue an order to buy the pass directly or to have the employer reimburse him after he purchased the pass, subject to the relevant regulations. At step 509, communication server 201 presents to the employee one or more passes that are stored in one or more databases, such as databases 360 and 394. At step 511 the employee chooses one or more passes. At step 513, the employee's account for that benefit is checked for sufficient balance. At step 515, the system initiates a purchase order for the pass. In one embodiment, communication server 201 transmits the purchase order to vendor communication device 203. At step 517, the transit vendor delivers the passes to the participant. In an alternative embodiment, the employee may use electronic agents that would initiate or repeat such a purchase processes without the physical intervention of the employee.

If the employee chooses to be reimbursed for eligible transit expenses instead of a direct purchase at Step 507, then at step 521, the employee would be presented with a form to submit a claim for reimbursements. The employee is given a choice to submit the claim electronically, by telephone facsimile, or by mail, and an indication as to whether a receipt would accompany the claim. At step 523, the employee submits the claim. At Step 525, the claim is reviewed in accordance to information stored in one or more databases such as databases 330, 360, 393 and 397. If the claim is adjudicated to be payable, the account is checked for sufficient balance at step 527. If there is sufficient account balance, a reimbursement is issued to the employee under Step 529. In one embodiment, the reimbursement may be in the form of a check, a direct deposit, an electronic funds transfer, a payroll adjustment, and any other media. In an alternative embodiment, the adjudication at step 525 can be made prior to step 521 such that the employee does not have to fill out a form for a benefit which is not eligible for reimbursement. In yet another embodiment, the order of step 527 and 529 can be reversed.

Referring to FIG. 5B, in yet another example, if the employee chose health care benefits at step 505, then at step 531, the employee would be presented with the following: obtain a portable payment device, pay the service provider directly, or submit a claim for reimbursement. At 533, if the employee chose to obtain a portable payment device, a specialized portable payment device is issued to the employee. In one embodiment, the participant uses portable payment device 204 at the vendor at step 535, which at step 537 then transmits information either directly to communication server 201 or indirectly through the credit/debit card network communication device 202. At step 538, communication server 201 adjudicates the claim by determining whether the services and vendors are eligible through comparison with one or more databases 330, 340, 390, 395, 397, and 375. In addition, the system may check whether the employee has sufficient account balance. At step 539, purchase approval or denial is sent from communication server 201 to communication devices 202 and/or 203. Detailed information concerning adjudicating pretax expenses using a portable payment device can be found in a co-pending application Ser. No. 10/193,402, by Jon Kessler, entitled "Systems and Methods for Adjudicating Pretax Expenses", filed Jul. 10, 2002, which is assigned to a common assignee of this application, which is hereby expressly incorporated by reference.

If the employee chose to have the medical service provider paid directly instead, then at step 541 the employee is asked to provide additional payee information. This information could be stored in database 393 so that the employee or any other employee may reuse the information for subsequent transactions. At step 543, the employee could also be asked a multitude of questions, including the timing, amount and frequency of payments to the payee. At step 545, communication server 201 determines whether the payments are eligible by comparing the information to one or more of the databases such as databases 330, 340, and 397. If communication server 201 determines that the item is eligible, then at step 547, communication server determines whether the employee has sufficient account balances to make such payment. If there is sufficient account balance, a payment is then issued to the payee at step 549. In one embodiment of the present invention, communication server transmits the payment instruction to bank communication device 206. Bank communication device transmits information bank account server 207, which determines how much and from which payor account to issue payment to the payee. In an alternative embodiment, communication server can print out instructions to the operator of communication server 201 to issue a payment to the payee.

Referring to FIG. 5C, in one embodiment, at step 551, the dollar cost of the benefits elected by the employee at step 505 is transmitted to the employer, which starts making deductions from the employee's pay at step 553. Step 551 can occur at any time after Step 505 has occurred.

In another embodiment, if during an inquiry about the account balance, e.g., at step 513, 525, or 547, it is found that the account balance is below the purchase amounts requested, the user can be further presented with alternative payment sources, such as additional payroll deductions, credit card account, debit card account, demand deposit accounts or other cash equivalent accounts at a financial institution. By offering the user the ability to supply such information, the purchase then can be completed without interruption.

When the purchase and transactions have been completed, at step 561, database 395 is updated to reflect the use of the benefits, and any remaining benefits that are available for subsequent purchases. In one embodiment, the information located in database 395 may be made available to the user through the Internet, through the IVR system 315, or by human telephone operators. In each case, the user is required to identify itself for authentication before the information is displayed. Step 561 may occur concurrently at any step after 517, 529, 539, 549, or 553, or sequentially after step 553.

The techniques described herein, namely, the presentment of the multiple conduits for the purchase of employee benefits using salary reduction amounts differs from existing processes and system in that the applicant's system allows the user to choose the type of conduit most appropriate for each benefit, instead of applying only one conduit to all benefits. By offering multiple conduits, users are provided with the convenience to choose the optimum method of benefits delivery, reduce the cash flow burden, and comply with the tax regulations.

Although the foregoing specification describes systems and methods related to employee pretax benefit, the embodiments of the invention are not limited to employee's pretax benefits. The embodiments of the invention may be utilized in situations where the transactions require a third party verification. For example, according one embodiment of the invention, apparatuses and methods may be used by an employee of a corporation where travel expenses may be claimed directly and instantly without further extra paper work or time delay during a business related trip.

For example, when an employee checks out at a hotel after an event related to its employment, the employee may use one of the plurality adjudicating conduits provided by the system to claim the corresponding business expenses at the checkout counter of the hotel. In one embodiment, the employee may use a portable payment device to adjudicate the expenses using one of the methods discussed above. Alternatively, the employee may pay for the hotel using her own money initially. Thereafter, the employee may communicate with the system to reimburse herself for the cost of staying at the hotel. Furthermore, the employee may direct the system to directly pay the hotel and deduct from her account or a corporate account maintained by the system.

In a further example, an employee of a corporation may use one of the plurality of conduits provided by the system to purchase a transit pass or a seasonal parking ticket for the commutes to employment related works. However, such expenses may not related to employee's pretax benefit, while such expenses may be tax deductible by the corporation. In one embodiment, the employee may purchase such items through a Web site maintained by the system. Alternatively, the employee may purchase such items through telephone or mail order. Other channels may be utilized.

Typically, the cost to stay in the hotel and meals are qualified under the tax law as meals and entertainment, which may be deductible as business expenses. However, the cost for renting a movie at the hotel may not qualify for such purposes. In which case, the clerk of the hotel (e.g., client) has to submit a request to claim the expenses on behalf of a user (e.g., employee). The clerk may use one of the plurality of conduit, such as portable payment device, to submit and adjudicate the expenses. The transaction facility (e.g., processing server) may issue a conditional denial to the hotel because it is not determinable whether the whole cost including the movie qualifies as business expenses.

Upon receiving the conditional denial from the server, the clerk may enter additional detailed information which may electronically be transmitted to the server. In one embodiment, such additional detailed information may include dividing the whole invoice into sub categories, such as rooms, meals, and movie of a hotel invoice. In one embodiment, the clerk (e.g., client) may enter the additional information through an electronic device with a touch pad, such as a touchtone phone. In an alternative embodiment, the client may enter such information through Internet, in which case the information may be transmitted in encrypted forms. Furthermore, the additional information may be entered through a Web site maintained by the system (e.g., the server). Other communication channels, such as personal digital assistants (PDAs), may be utilized.

Upon receiving the additional information from the client (e.g., the clerk of the hotel), the server determines whether all or part of the transaction may qualify for business expenses, and issues permanent approval or denial to the client based on the additional detailed information. In this example, the rooms and meals may qualify, while the movie may not qualify for business expenses. Other configuration may exist.

Figure 6:
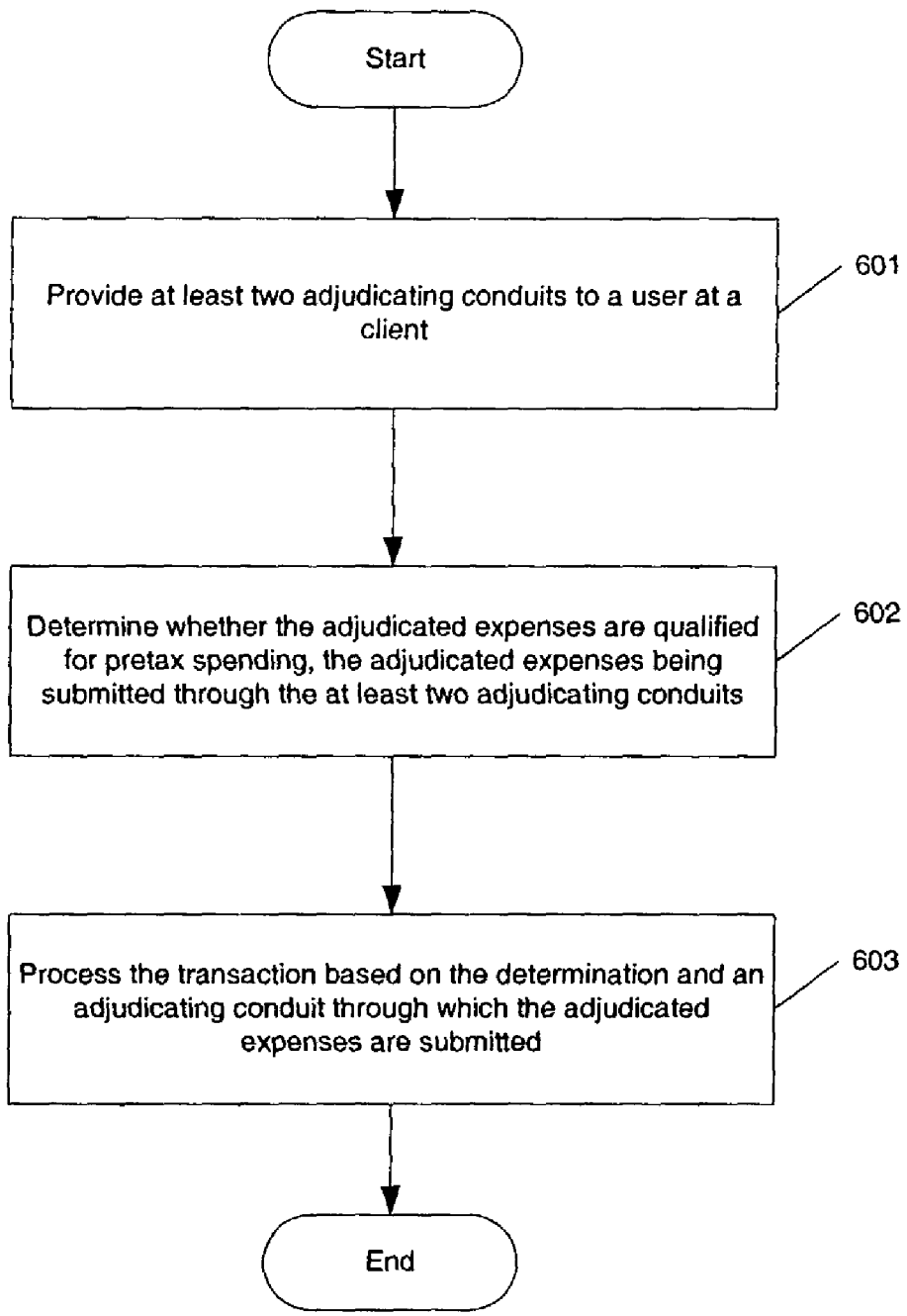
FIG. 6 shows a flow chart illustrating exemplary claim processing.

FIG. 6 shows a flowchart illustrating an exemplary method for adjudicating expenses in accordance with an aspect of the invention. In one embodiment, the method 600 includes providing at least two adjudicating conduits, determining whether the adjudicated expenses are qualified for pretax spending, the adjudicated expenses being submitted through the at least two adjudicating conduits, and processing the transaction based on the determination and an adjudicating conduit through which the adjudicated expenses are submitted.

Referring to FIG. 6, at block 601, a user or an employee is provided at least two adjudicating conduits for adjudicating pretax expenses. In one embodiment, the at least two adjudicating conduits may include catalog-based purchases, directed payment to a qualified vendor such as a health care provider, adjudicating expenses through a portable payment device, and a reimbursement process. The user may select one of the plurality of conduits to submit a request for adjudicate expenses. At block 602, the server determines whether the adjudicated expenses submitted from a client are qualified for pretax spending. At block 603, the server processes the transaction based on the determination and the adjudicating conduit through which the adjudicated expenses are submitted.

For example, if the user chooses to purchase a qualified pretax item, such as a transit pass, from a catalog. The system may checks whether the corresponding user account has sufficient funding to support such purchase. If the user account has sufficient funding to support such purchase, the system then delivers the item purchased and deducts the corresponding amount from the user account. If, however, the user chooses to pay for the item by herself and request for reimbursement. The system may present a form for reimbursement and adjudicates the reimbursement form to determine whether the reimbursed item is qualified for pretax purpose and whether the user account has sufficient funding to support the transaction. The reimbursement form may be provided electronically, such as a Web site or telephone.

Figure 7:
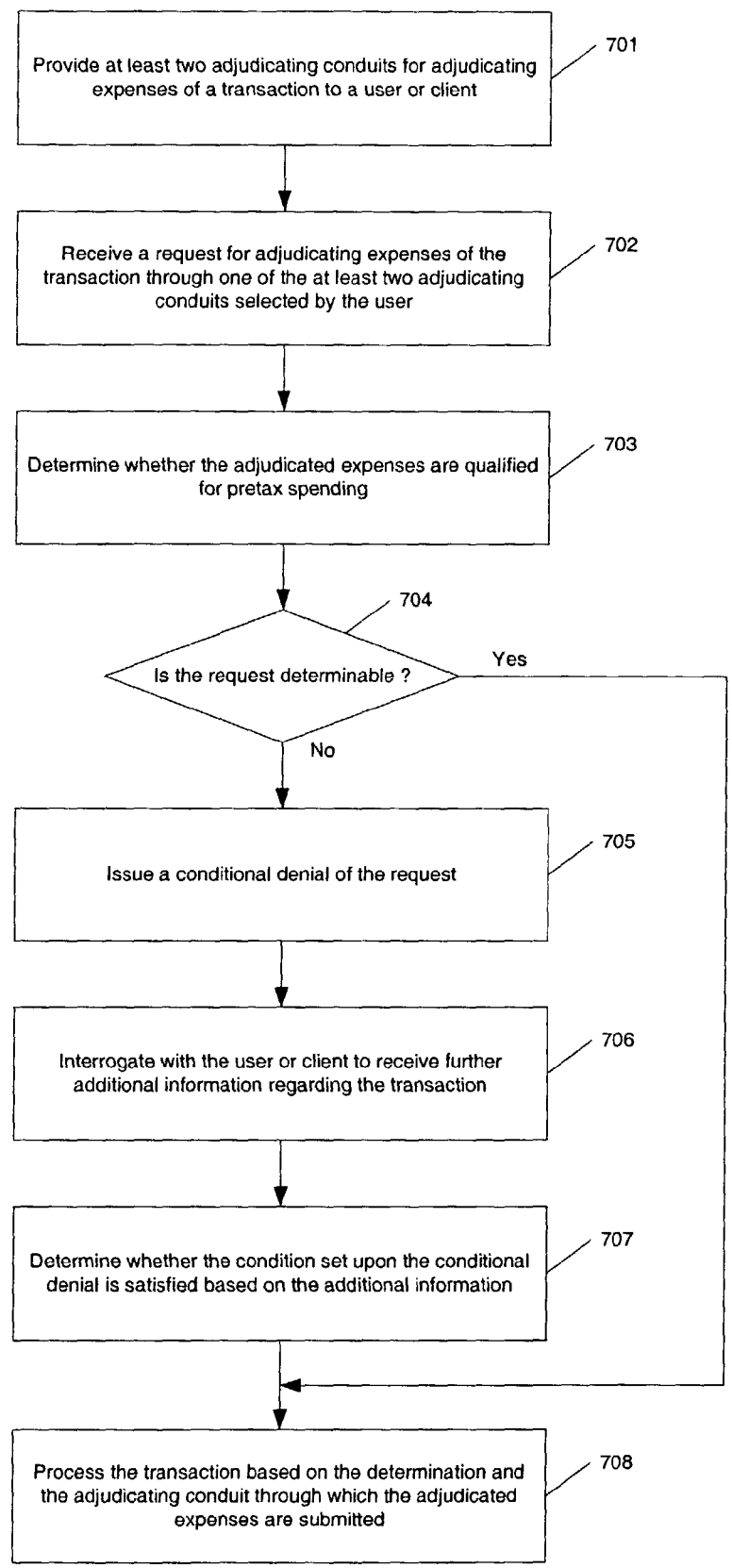
FIG. 7 shows a flow chart illustrating exemplary claim processing.

FIG. 7 shows a flowchart illustrating an exemplary method for adjudicating expenses of a transaction in accordance with an aspect of the invention. At block 701, a plurality of adjudicating conduits is provided to a user or a client. When the user chooses one of the conduits and submits the request to adjudicate the expenses, at block 702, the server receives the request through the selected conduit. At block 703, the server determines whether the adjudicated expenses are qualified for pretax spending. At block 704, if the adjudicated expenses are not determinable at the time, at block 705, the server issues a conditional denial to the request. At block 706, the server interrogates with the client to receive additional information regarding the transaction. For example, the client may provide further additional itemized information to the server. At block 707, the server determines whether the additional information satisfies the condition set upon the conditional denial. At block 708, the transaction is processed by the client and the server based on the determination and the adjudicating conduit through which the adjudicated expenses are submitted.

Figure 8:
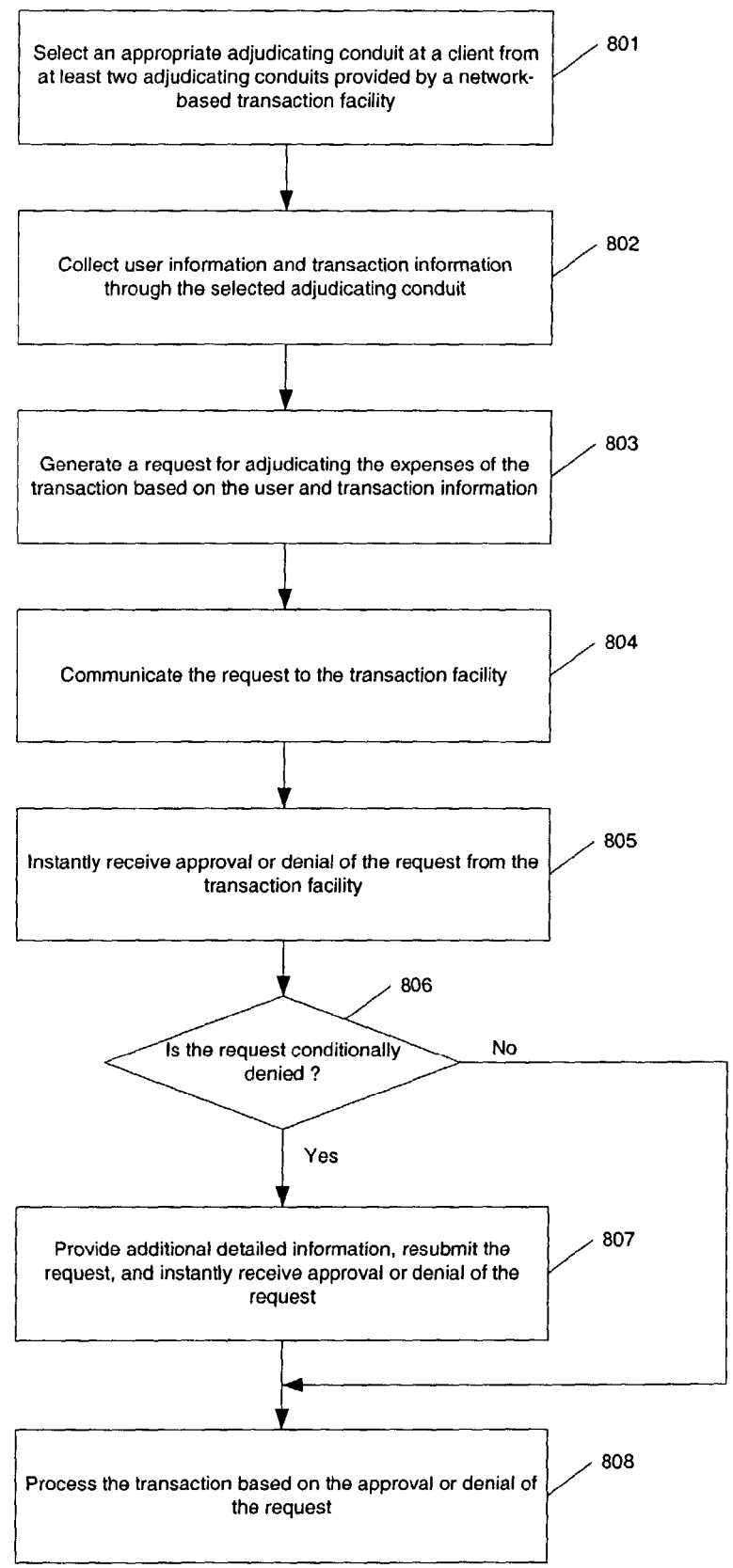
FIG. 8 shows a flow chart illustrating exemplary claim processing.

FIG. 8 shows a flowchart illustrating an exemplary method for adjudicating expenses of a transaction in accordance with an aspect of the invention. Referring to FIG. 8, at block 801, a user selects an appropriate adjudicating conduit at a client from at least two adjudicating conduits provided by a network-based transaction facility. At block 802, the client collects user information and transaction information through the selected conduit. For example, if the user chooses to adjudicate with a portable payment device, the client collects the user information through the portable payment device. The user information may be stored in the portable payment device. In one embodiment, the information stored in the portable payment device may include at least one of the following information: user identification, account identification, a time period upon which the funding may be used, types of pretax expenses allowed, an available balance for the time period, and approval or disapproval codes for the transaction.

At block 803, the client generates a request for adjudicating the expenses based on the collected user information and the transaction information. In one embodiment, the request may include at least one of the following information: a user identity, user account information, information regarding type of the expenses, an expense amount, a date of transaction, a dollar amount of transaction, an identity of the client, products or services involved in the transaction, and a type of entity of the client.

At block 804, the request is communicated to the server via a network. In one embodiment, the request may be transmitted through a regular credit card network. Alternatively, the request may be transmitted through Internet or a wireless network through a PDA device. Other networks may be utilized. At block 805, the client instantly receives an approval or denial of the request from the transaction facility via the network. At block 806, if the denial is a conditional denial, at block 807, the client may provide additional detailed information (e.g., itemized transaction information), resubmits the request, and instantly receives further approval or denial. At block 808, the client proceeds to finish the transaction based on the approval or denial received.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A computer implemented method for adjudicating expenses of a transaction administrated by a transaction facility, the method comprising:

receiving electronically at the transaction facility a request from a user for adjudicating expenses to be qualified for pretax spending, the user being one of a plurality of users registered with the transaction facility, wherein the transaction facility maintains a pretax account for each of the users for funding the requested adjudication;

in response to the requested adjudication, the transaction facility determining whether the adjudicated expenses of a transaction are qualified for pretax spending, including submitting the adjudicated expenses through at least two adjudicating conduits, including a directed payment mechanism to one or more vendors, an expense adjudication mechanism through a portable payment device, and a reimbursement mechanism, wherein the at least two adjudicating conduits include a catalog-based transaction through which a user is able to purchase an item from a catalog maintained by the transaction facility wherein said transaction purchase of said item, wherein the purchased item qualifies for pretax purposes under a government benefit regulation and is purchased using funding deducted from the pretax account associated with the requesting user, and wherein the pretax spending is to be drawn from pretax funding previously set aside by an employer of the user and deducted from a paycheck of the user for services performed for the employer, the pretax funding is set aside prior to paying an income tax of the user from the paycheck; and processing the transaction based on the determination and based on which adjudicating conduit the adjudicated expenses are received.

2. The method of claim 1, further comprising:

selecting one adjudicating conduit from the at least two adjudicating conduits provided; and submitting a request for adjudicating expenses of the transaction through the selected adjudicating conduit to the transaction facility.

3. The method of claim 2, wherein the determining whether the adjudicated expenses are qualified for pretax spending is made based on a set of rules having information necessarily to determine whether purchases to be made by the user through the at least two conduits are allowed under a governing law and a limitation imposed on the employer.

4. The method of claim 3, wherein the set of rules comprises:

whether a client submitting the adjudicated expenses is eligible to handle the transaction;

whether a type of the transaction is qualified for the expenses being adjudicated; and whether a balance of corresponding user account supports the transaction.

5. The method of claim 4, further comprising accessing at least one database to determine whether the adjudicated expenses are qualified for pretax spending.

6. The method of claim 2, wherein the request comprises information including:

a user identity;

user account information;

information regarding type of the expenses;

an expense amount;

a date of transaction;

a dollar amount of transaction;

an identity of the client;
products or services involved in the transaction; and
a type of entity of the client.

7. The method of claim 4, wherein if whether the adjudicated expenses are qualified for pretax spending is not determinable, the method further comprises:
issuing conditional denial to a client submitting the adjudicated expenses;
interrogating with the client over a network to receive additional information regarding the transaction;
determining whether the additional information satisfies the condition set upon the denial; and
issuing an approval of the request to the client if the condition is satisfied.

8. The method of claim 7, wherein the set of rules is stored in a rule database including one or more "if-then-else" statements representing questions as to whether the purchased item is eligible, an amount that the user may use for the item, and questions to be posed to a merchant regarding details of the item to be purchased.

9. The method of claim 8, further comprising:
maintaining a direct payment account of the user to issue a direct payment to one or more vendors;
obtaining an authorization from the user to transfer additional funding from one or more financial accounts associated with the user, the one or more financial accounts being maintained by one or more financial institutions; and
transferring the additional funding from the one or more financial account to the direct payment account.

10. The method of claim 9, further comprising withdrawing funding from the pretax account to support the transaction if the adjudicated expenses of the transaction are qualified for pretax spending.

11. The method of claim 10, wherein the user is an employee of at least one employer, wherein the method further comprises:
obtaining an authorization from the user to withdraw additional funding from a payroll of the at least one employer; and
depositing the additional funding to the pretax account.

12. The method of claim 11, wherein the pretax account stores information including:
user identification;
account identification;
a time period upon which the funding may be used;
types of pretax expenses allowed;
an available balance for the time period; and
approval or disapproval codes for the transaction.

13. The method of claim 12, wherein the at least two adjudicating conduits allow the user to select appropriate types of conduits for adjudicating different benefits instead of a single conduit for adjudicating all different benefits.

14. The method of claim 13, further comprising a merchant code database to store information for identifying a vendor providing the item to be pretax purchased by the user, including numeric data used by a standard credit/debit card network to identify a type of the vendor.

15. The method of claim 14, further comprising an eligible medical services database to maintain a list of services that are eligible for reimbursement as medical expenses under government benefit regulation.

16. The method of claim 15, further comprising an eligible medial product database to maintain a list of products that are eligible for reimbursement as medical expenses under the government benefit regulation.

17. The method of claim 16, further comprising an eligible dependent care services database to maintain a list of services that are eligible for reimbursement as dependent care expenses under the government benefit regulation.

18. The method of claim 17, further comprising an eligible transit product database to maintain data regarding products that are considered eligible for transit benefits under the government benefit regulation, including a type of media, which includes at least one of a magnetic strip, paper, and electronic form, vendors that supply such products, and which transit systems such products can be used.

19. The method of claim 18, further comprising eligible parking product database to maintain information related to commute services including parking services that are considered eligible for commuter benefits under the government benefit regulation.

20. The method of claim 19, further comprising an eligible van pool product database to maintain data regarding van pool services that are considered eligible for commuter benefits under the government benefit regulation, including identifiers of service providers, geographical area for which the services are provided, and addresses of the services providers.

21. The method of claim 20, further comprising a portable payment device database to maintain data of all portable payment devices that have been issued, wherein the portable payment device database includes, for each portable payment device, an individual name, a device identifier, a date range for which the device is usable for payment, a type of the device, benefits that the device can be used to purchase, and an active or inactive status of the device.

22. The method of claim 21, further comprising a payee database to maintain information of possible payees, which can be different from actual service and/or product providers, wherein the payee database includes, for each payee, an identifier, an address, and a tax identification of each payee.

23. The method of claim 22, further comprising a transaction history database to maintain data related to transaction history of each portable payment device, wherein the transaction history is configured to record all transactions, starting from a maximum available benefits for a particular pretax item to each approved and unapproved transaction, and related time and dates that such transactions occurred, and wherein the transaction history database includes a user identification field, a user name field, a maximum benefit field, a type of benefit field, a duration of the maximum benefit field, a date of transaction field, an amount of transaction requested field, a merchant code field, a merchant name field, a name of recipient field, a product/service type code field, a transaction authorization code field, an amount of transaction approved field, and a data/time of approval field.

24. A machine-readable medium having executable code to cause a machine to perform a method for adjudicating expenses of a transaction administrated by a transaction facility, the method comprising:
receiving electronically at the transaction facility a request from a user for adjudicating expenses to be qualified for pretax spending, the user being one of a plurality of users registered with the transaction facility, wherein the transaction facility maintains a pretax account for each of the users for funding the requested adjudication;
in response to the requested adjudication, the transaction facility determining whether the adjudicated expenses of a transaction are qualified for pretax spending, including submitting the adjudicated expenses through at least two adjudicating conduits, including a directed payment mechanism to one or more vendors, an expense adjudication mechanism through a portable payment device, and a reimbursement mechanism, wherein the at least two adjudicating conduits includes a catalog-based transaction through which a user is able to purchase an item from a catalog maintained by the transaction facility wherein said transaction purchase of said item, wherein the purchased item qualifies for pretax purposes under a government benefit regulation and is purchased using funding deducted from the pretax account associated with the requesting user, and wherein the pretax spending is to be drawn from pretax funding previously set aside by an employer of the user and deducted from a paycheck of the user for services performed for the employer, the pretax funding is set aside prior to paying an income tax of the user from the paycheck; and processing the transaction based on the determination and based on which adjudicating conduit the adjudicated expenses are received.

25. The machine-readable medium of claim 24, wherein the method further comprises:

selecting the adjudicating conduit from the at least two adjudicating conduits provided; and submitting a request for adjudicating expenses of the transaction through the selected adjudicating conduit to the transaction facility.

26. The machine-readable medium of claim 25, wherein the determining whether the adjudicated expenses of a transaction are qualified for pretax spending is made based on a set of rules having information necessarily to determine whether purchases to be made by the user through the at least two conduits are allowed under a governing law and a limitation imposed on the employer.

27. The machine-readable medium of claim 26, wherein the set of rules comprises:

whether a client submitting the adjudicated expenses is eligible to handle the transaction;

whether a type of the transaction is qualified for the expenses being adjudicated; and whether a balance of corresponding user account supports the transaction.

28. The machine-readable medium of claim 25, wherein the request comprises information including:

a user identity;
user account information;
information regarding type of the expenses;
an expense amount;
a date of transaction;
a dollar amount of transaction;
an identity of the client;
products or services involved in the transaction; and
a type of entity of the client.

29. The machine-readable medium of claim 24, wherein if whether the adjudicated expenses are qualified for pretax spending is not determinable, the method further comprises:

issuing conditional denial to a client submitting the adjudicated expenses;

interrogating with the client over a network to receive additional information regarding the transaction;

determining whether the additional information satisfies the condition set upon the denial; and issuing an approval of the request to the client if the condition is satisfied.

30. The machine-readable medium of claim 24, wherein the pretax account of each user is established prior to submitting the request using funding deducted from a payroll an employer associated with the respective user.

31. The machine-readable medium of claim 30, wherein the method further comprises:

maintaining a direct payment account of the user to issue a direct payment to one or more vendors;

obtaining an authorization from the user to transfer additional funding from one or more financial accounts associated with the user, the one or more financial accounts being maintained by one or more financial institutions; and transferring the additional funding from the one or more financial account to the direct payment account.

32. The machine-readable medium of claim 30, wherein the method further comprises withdrawing funding from the pretax account to support the transaction if the adjudicated expenses of the transaction is qualified for pretax spending.

33. The machine-readable medium of claim 30, wherein the user is an employee of at least one employer, wherein the method further comprises:

obtaining an authorization from the user to withdraw additional funding from a payroll of the at least one employer; and depositing the additional funding to the pretax account.

34. The machine-readable medium of claim 30, wherein the at least two adjudicating conduits allow the user to select appropriate types of conduits for adjudicating different benefits instead of a single conduit for adjudicating all different benefits.

35. The machine-readable medium of claim 34, wherein if the transaction is related to the catalog-based transaction, the method further comprises:

deducting amount associated with the transaction from the pretax account;

transferring the amount associated with the transaction to one or more vendors in connection with the transaction; and delivering one or more items of the transaction to the user.

36. The machine-readable medium of claim 34, wherein if the user chooses direct payment conduit, the method further comprises:

obtaining payee information from the user; and
scheduling a payment to the designated payee.

37. The machine-readable medium of claim 36, wherein the payment is scheduled by the user.

38. The machine-readable medium of claim 34, wherein if the user chooses adjudicate an expense through a portable payment device, the method further comprises collecting user information via the portable payment device, wherein the portable payment device stores information including:

user identification;
account identification;
a time period upon which the portable payment device may be used;
types of pretax expenses allowed;
an available balance for the time period; and
approval or disapproval codes for the transaction.

39. The machine-readable medium of claim 24, wherein the method further comprises:

collecting user information at a client wherein the transaction occurs;

collecting transaction information at the client;

generating the request, based on the transaction and user information; and communicating the request to the transaction facility via a network.

40. The machine-readable medium of claim 24, wherein the transaction is associated with benefits of an employee of at least one employer, wherein the method further comprises:

collecting employee information from the at least one employer; and storing the employee information in the transaction facility.

41. The machine-readable medium of claim 40, wherein the method further comprises:
  storing employee information in a database at the transaction facility, wherein the employee information is accessible through a network; and
  storing employer information of the at least one employer at the transaction facility.

42. The machine-readable medium of claim 40, wherein the method further comprises notifying the at least one employer after the transaction is completed.

43. The machine-readable medium of claim 40, wherein the pretax spending is limited to an amount previously set aside by the at least one employer.

44. An apparatus for adjudicating expenses of a transaction administrated by a transaction facility, the apparatus comprising:
  means for receiving electronically at the transaction facility a request from a user for adjudicating expenses to be qualified for pretax spending, the user being one of a plurality of users registered with the transaction facility, wherein the transaction facility maintains a pretax account for each of the users for funding the requested adjudication;
  means for determining in response to the requested adjudication, the transaction facility, means for determining whether the adjudicated expenses of a transaction are qualified for pretax spending, including means for submitting the adjudicated expenses through at least two adjudicating conduits, including a directed payment mechanism to one or more vendors, an expense adjudication mechanism through a portable payment device, and a reimbursement mechanism, wherein the at least two adjudicating conduits includes a catalog-based transaction through which a user is able to purchase an item from a catalog maintained by the transaction facility, wherein the purchased item qualifies for pretax purposes under a government benefit regulation and is purchased using funding deducted from the pretax account associated with the requesting user, and wherein the pretax spending is to be drawn from pretax funding previously set aside by an employer of the user and deducted from a paycheck of the user for services performed for the employer, the pretax funding is set aside prior to paying an income tax of the user from the paycheck; and
  means for processing the transaction based on the determination and based on which adjudicating conduit the adjudicated expenses are received.

45. The apparatus of claim 44, further comprising:
  means for selecting one adjudicating conduit from the at least two adjudicating conduits provided; and
  means for submitting a request for adjudicating expenses of the transaction through the selected adjudicating conduit to the transaction facility.

46. The apparatus of claim 45, wherein the request comprises information including:
  a user identity;
  user account information;
  information regarding type of the expenses;
  an expense amount;
  a date of transaction;
  a dollar amount of transaction;
  an identity of the client;
  products or services involved in the transaction; and
  a type of entity of the client.

47. The apparatus of claim 44, wherein the determining whether the adjudicated expenses of a transaction are qualified for pretax spending is made based on a set of rules.

48. The apparatus of claim 47, wherein the set of rules comprises condition selected from the group consisting of:
  whether a client submitting the adjudicated expenses is eligible to handle the transaction;
  whether a type of the transaction is qualified for the expenses being adjudicated; and
  whether a balance of corresponding user account supports the transaction.

49. The apparatus of claim 44, wherein if whether the adjudicated expenses are qualified for pretax spending is not determinable, the apparatus further comprises:
  means for issuing conditional denial to a client submitting the adjudicated expenses;
  means for interrogating with the client over a network to receive additional information regarding the transaction;
  means for determining whether the additional information satisfies the condition set upon the denial; and
  means for issuing an approval of the request to the client if the condition is satisfied.

50. The apparatus of claim 44, wherein the pretax account of each user is established prior to submitting the request using funding deducted from a payroll an employer associated with the respective user.

51. The apparatus of claim 50, further comprising:
  means for maintaining a direct payment account to issue a direct payment to at least one vendors;
  means for obtaining an authorization from the user to transfer additional funding from one or more financial accounts associated with the user, the one or more financial accounts being maintained by one or more financial institutions; and
  means for transferring the additional funding from the one or more financial account to the direct payment account.

52. The apparatus of claim 50, further comprising means for withdrawing funding from the pretax account to support the transaction if the adjudicated expenses of the transaction are qualified for pretax spending.

53. The apparatus of claim 50, wherein the user is an employee of at least one employer, wherein the apparatus further comprises:
  means for obtaining an authorization from the user to withdraw additional funding from a payroll of the at least one employer; and
  means for depositing the additional funding to the pretax account.

54. The apparatus of claim 50, wherein the at least two adjudicating conduits allow the user to select appropriate types of conduits for adjudicating different benefits instead of a single conduit for adjudicating all different benefits.

55. The apparatus of claim 54, wherein if the transaction is related to the catalog-based transaction, the apparatus further comprises:
  means for deducting amount associated with the transaction from the pretax account;
  means for transferring the amount associated with the transaction to one or more vendors in connection with the transaction; and
  delivering one or more items of the transaction to the user.

56. The apparatus of claim 54, wherein if the user chooses direct payment conduit, the apparatus further comprises:
  means for obtaining payee information from the user; and
  means for scheduling a payment to the designated payee.

57. The apparatus of claim 56, wherein the payment is scheduled by the user.

58. The apparatus of claim 54, wherein if the user chooses adjudicate an expense through a portable payment device, the apparatus further comprises means for collecting user information via the portable payment device, wherein the portable payment device stores information including:
- user identification;
- account identification;
- a time period upon which the portable payment device may be used;
- types of pretax expenses allowed;
- an available balance for the time period; and
- approval or disapproval codes for the transaction.

59. The apparatus of claim 44, further comprising:
- means for collecting user information at a client wherein the transaction occurs;
- means for collecting transaction information at the client;
- means for generating the request, based on the transaction and user information; and
- means for communicating the request to the transaction facility via a network.

60. The apparatus of claim 44, wherein the transaction is associated with benefits of an employee of at least one employer, wherein the apparatus further comprises:
- means for collecting employee information from the at least one employer; and
- means for storing the employee information in the transaction facility.

61. The apparatus of claim 60, further comprising:
- means for storing employee information in a database at the transaction facility, wherein the employee information is accessible through a network; and
- means for storing employer information of the at least one employer at the transaction facility.

62. The apparatus of claim 60, further comprising means for notifying the at least one employer after the transaction is completed.

63. The apparatus of claim 60, wherein the pretax spending is limited to an amount previously set aside by the at least one employer.

* * * * *